Jan. 22, 1924.
J. J. COLE
1,481,282
WEIGHING MACHINE
Filed March 2, 1920
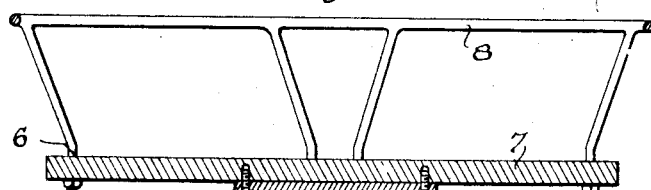
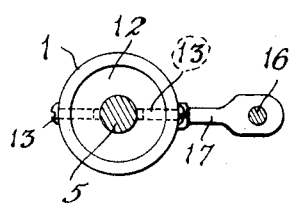
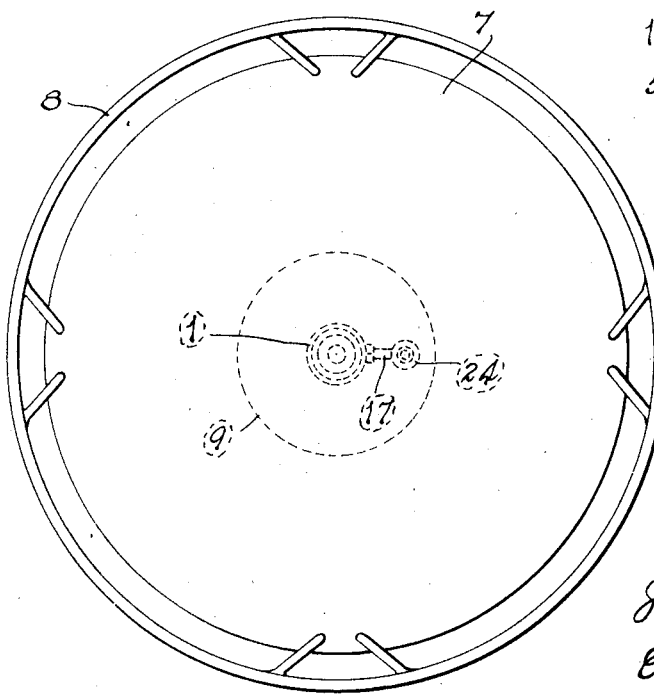
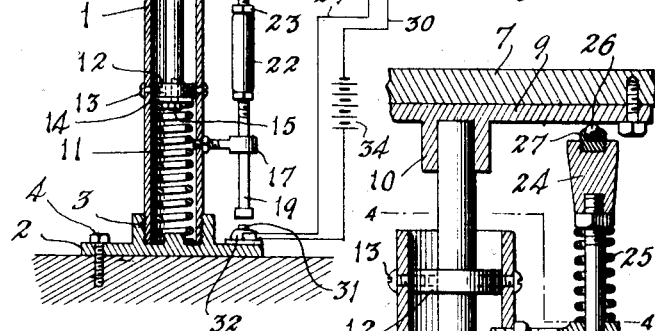
INVENTOR:
John J. Cole
BY
Everett H. Rook.
ATTORNEYS.

Patented Jan. 22, 1924.

1,481,282

UNITED STATES PATENT OFFICE.

JOHN J. COLE, OF ORANGE, NEW JERSEY.

WEIGHING MACHINE.

Application filed March 2, 1920. Serial No. 362,821.

*To all whom it may concern:*

Be it known that I, JOHN J. COLE, a citizen of the United States, and a resident of Orange, in the county of Essex and State of New Jersey, have invented new and useful Improvements in Weighing Machines, of which the following is a specification.

This invention relates in general to weighing machines and more particularly to machines of this character for weighing batches or lots of laundry. It is customary in steam laundries and the like to divide the soiled articles into batches of equal size before they are placed in the laundering machines, and this division of the articles has heretofore been made by placing the articles in receptacles of equal size or piling the soiled articles in piles of as nearly equal size as could be determined by rought estimate. These methods are inaccurate and one batch frequently weighs more or less than other batches because of tighter or looser packing or varying weights of the individual articles.

The objects of the present invention are to provide improved means for accurately dividing the soiled articles into batches of equal weight; to provide a weighing machine whereby the batches of articles can be successively weighed and apportioned by weight so that the batches will contain equal amounts of articles; to secure a weighing machine which is adjustable to various weights so that larger or smaller batches may be weighed at will; to obtain such a machine which indicates when the weight of the articles equals the predetermined weight to which the machine is adjusted; to provide improved electric circuit closing means for operating a visible or audible signal when a predetermined weight is placed upon the machine, and to obtain other results and advantages as may be brought out by the following description.

Referring to the accompanying drawings, in which like numerals of reference indicate the same parts throughout the several views, Figure 1 is a vertical sectional view through a weighing machine embodying my invention, portions being shown in side elevation;

Figure 2 is a top plan view of the machine;

Figure 3 is an enlarged fragmentary sectional view through the upper end of the pedestal and adjusting mechanism;

Figure 4 is a horizontal sectional view on the line 4—4 of Fig. 3, and

Figure 5 is a sectional view through the circuit closing mechanism.

Specifically describing the present embodiment of my invention, the reference numeral 1 designates a tubular pedestal adapted to be secured vertically to any suitable support by means of a base plate 2 into which the lower end of the pedestal 1 is screwed as at 3, said base plate being secured to the support by means of screws 4. Slidably mounted within the pedestal 1 is a rod 5 upon the upper end of which is mounted a weighing or scale platform or basket 6, said basket being shown as comprising a substantially circular bottom 7 having an upstanding peripheral rail 8 secured to the top side thereof, and said platform having secured to the underside thereof an attaching plate 9 provided with a socketed boss 10 fitting over the upper end of the rod 5.

A compression weighing spring 11 is interposed between the base plate 2 and the lower end of the said platform rod 5, said spring normally forcing said rod 5 upwardly. The rod 5 is slidable through a pair of guide bearing rings 12 secured to the pedestal 1 on the inside thereof at spaced points by means of the screws 13 passing through the pedestal walls and into the rings 12, and the lower end of the rod 5 is provided with a stop plate 14 secured thereto by a screw 15, said stop plate normally engaging the under side of the lower bearing ring 12 to limit the outward movement of the rod 5 under the influence of the spring 11. The spring 11 is of sufficient strength to weigh the largest amount of articles or material it is desired to weigh on the machine, and obviously as articles or material are placed upon the platform 6 or pressure exerted thereon, the same will overcome the resistance of the spring and gradually descend as the weight increases, the degree of movement varying with the weight.

For the purpose of adjusting the machine to weigh a predetermined quantity of material an adjusting member 16 is slidably mounted in brackets 17 projecting from the pedestal 1, said adjusting member comprising a pair of rods 18 and 19 the adjacent ends of which are provided with right and left hand threads 20 and 21, respectively, and connected by means of a turnbuckle 22, clamping nuts 23 being provided at the ends of the turnbuckle to hold the rods in adjusted position. The upper end of the upper rod 18 is provided with a head 24 between which and the upper bracket 17 is interposed a compression spring 25. A ball 26 is fitted within a socket 27 detachably applied to the upper end of the head 24, and the said ball is constantly held in engagement with the underside of the attaching plate 9 by the spring 25.

Arranged upon the base plate 2 beneath the lower end of the lower adjusting rod 19 is an electric circuit closer of any desirable construction, said circuit closer being shown as comprising a pair of spring contacts 27 and 28 connected to the wires 29 and 30, respectively, said contacts being adapted to be forced together by pressure upon the push button 31 slidable in the casing 32 and supported upon the contact 27. Obviously, pressure upon the button 31 as by the descent of the adjusting member 16 will force the contacts 27 and 28 together. Any desirable signal, such as a bell or buzzer 33 or a lamp, may be connected between the wires 29 and 30 so as to be actuated by the battery 34 or other source of electricity when the circuit is closed. The length of the adjusting member 16 is adjustable by turning of the turnbuckle 22, and the descent of the platform 6 will be limited by engagement of the lower end of the adjusting rod 19 with the circuit closer, and as the degree of descent of the platform 6 against the spring varies with the weight on the platform, obviously, the adjustment of the rods 18 and 19 to lengthen or shorten the member 16 will limit the descent of the platform at a certain point which will indicate that the weight of the material or pressure on the platform is equal to the predetermined amount at which the adjusting member is set. In the operation of the device for weighing laundry batches a sheet or blanket is thrown over the platform 6 and smaller articles thrown into the same. The adjusting member 16 is adjusted by manipulation of the turnbuckle 22, and articles piled upon the platform until the platform descends sufficiently to force the adjusting member 16 down upon the circuit closer. The descent of the platform is thus stopped and the signal 33 actuated to warn the operator. The batch of articles is then folded into the sheet and removed from the platform 6. A second batch is then weighed in the same manner, and with no further adjustment of the member 16, obviously all succeeding batches will be of the same weight as the first. If the adjusting member 16 is lengthened the descent of the platform will be stopped with less weight upon it and vice versa. The adjusting member 16 is loosely slidable in the brackets 17 and the ball 26 serves as a roller bearing against the attaching plate 9 to allow slight rotation or tilting of the platform 6 incident to operation without causing undue friction.

While I have described my invention for use in laundries, it is to be understood that it is capable of use for weighing other articles where it is desired to produce successive lots of equal weight, or for adjusting or testing pressure of spring devices or the like, and furthermore it will be obvious that many detail modifications and changes can be made in the construction of my machine without departing from the spirit or scope of the invention. Therefore I do not desire to be limited in the use of my invention except as required by the following claims when construed in the light of the prior art.

Having thus described the invention, what I claim is:

1. In a device of the character described, the combination of a fixed member, a pressure receiving member, yielding means interposed between said fixed member and said pressure receiving member to allow said pressure receiving member to move toward said fixed member as pressure is applied to said pressure receiving member, and an extensible member interposed between said fixed member and said pressure receiving member for regulating the amount of movement of said pressure receiving member.

2. In a device of the character described, the combination of a fixed member, a pressure receiving member, yielding means interposed between said fixed member and said pressure receiving member to allow said pressure receiving member to move toward said fixed member as pressure is applied thereto, means slidably mounted between said fixed member and said pressure receiving member for limiting the said movement of the pressure receiving member, and means for maintaining said limiting means in engagement with said pressure receiving member.

3. In a device of the character described, the combination of a fixed member, a pressure receiving member, yielding means interposed between said fixed member and said pressure receiving member to allow said pressure receiving member to move toward said fixed member as pressure is applied thereto, adjustable means slidably mounted between said fixed member and said pressure receiving member for limiting the said movement of the pressure receiving member, and means for maintaining said limiting means in engagement with said pressure receiving member.

4. In a device of the character described, the combination of a fixed member, a pressure receiving member, yielding means interposed between said fixed member and said pressure receiving member to allow said pressure receiving member to move toward said fixed member as pressure is applied thereto, extensible means slidably mounted between said fixed member and said pressure receiving member for limiting the said movement of the pressure receiving member, and means for maintaining said limiting means in engagement with said pressure receiving member.

5. In a device of the character described, the combination of a fixed member, a pressure receiving member, yielding means interposed between said fixed member and said pressure receiving member to allow said pressure receiving member to move toward said fixed member as pressure is applied to said pressure receiving member, a normally open electric circuit closer comprising a pair of contacts, a movable member interposed between said fixed member and said pressure receiving member to limit said movement of the pressure receiving member, said limiting member being forced into engagement with said circuit closer to close the circuit therethrough as the pressure receiving member moves a predetermined distance, and means for normally maintaining said limiting member out of engagement with said circuit closer.

6. In a device of the character described, the combination of a fixed member, a pressure receiving member adapted to move toward and away from said fixed member, a tubular guide for said pressure receiving member, a spring interposed between said fixed member and said pressure receiving member within said tubular guide, a member slidably mounted on said guide exteriorly thereof and arranged between said fixed member and said pressure receiving member to limit movement of said pressure receiving member toward said fixed member, and an electric circuit closer actuated by said slidable stop member as said pressure receiving member moves toward said fixed member a predetermined distance.

JOHN J. COLE.